US012810426B2

(12) United States Patent
Lee

(10) Patent No.: US 12,810,426 B2
(45) Date of Patent: Nov. 24, 2026

(54) METHOD FOR PROCESSING IMAGE, AN ELECTRONIC APPARATUS AND A COMPUTER READABLE STORAGE MEDIUM

(71) Applicant: MEDIT CORP., Seoul (KR)

(72) Inventor: Hotaik Lee, Seoul (KR)

(73) Assignee: MEDIT CORP., Seoul (KR)

( * ) Notice: Subject to any disclaimer, the term of this patent is extended or adjusted under 35 U.S.C. 154(b) by 124 days.

(21) Appl. No.: 18/994,005

(22) PCT Filed: Jul. 13, 2023

(86) PCT No.: PCT/KR2023/010063
§ 371 (c)(1),
(2) Date: Jan. 13, 2025

(87) PCT Pub. No.: WO2024/014914
PCT Pub. Date: Jan. 18, 2024

(65) Prior Publication Data

US 2026/0030747 A1 Jan. 29, 2026

(30) Foreign Application Priority Data

Jul. 13, 2022 (KR) ........................ 10-2022-0086432
Jul. 12, 2023 (KR) ........................ 10-2023-0090641

(51) Int. Cl.
*G06T 7/11* (2017.01)
*A61C 7/00* (2006.01)
(Continued)

(52) U.S. Cl.
CPC ............ *G06T 7/0012* (2013.01); *A61C 7/002* (2013.01); *G06T 7/11* (2017.01); *G06T 7/74* (2017.01);
(Continued)

(58) Field of Classification Search
CPC . G06T 7/0012; G06T 7/11; G06T 7/74; G06T 19/20; G06T 2200/24;
(Continued)

(56) References Cited

U.S. PATENT DOCUMENTS 11,039,905 B2 6/2021 Je
11,116,606 B1 9/2021 Raslambekov
(Continued)

FOREIGN PATENT DOCUMENTS

CN 108986209 12/2018
JP 5869822 B2 2/2016
(Continued)

OTHER PUBLICATIONS

Medit Academy, "Creating a Splint Using the Medit Design App", Youtube, (Feb. 25, 2022), URL: https://www.youtube.com/watch?v=3-7aPiTDpv8, (Feb. 5, 2024), XP093127248.
(Continued)

*Primary Examiner* — Vijay Shankar
(74) *Attorney, Agent, or Firm* — Kenneth C. Booth; Booth Udall, PLC

(57) ABSTRACT

A method for processing an image, an electronic apparatus performing the same, and a computer readable storage medium storing the same are provided. A method for processing an image includes: receiving at least one intraoral image; setting a plurality of outline points for the at least one intraoral image; and displaying an outline designated based on the plurality of outline points on the at least one intraoral image.

18 Claims, 15 Drawing Sheets

(51) Int. Cl.
*G06T 7/00* (2017.01)
*G06T 7/73* (2017.01)
*G06T 19/20* (2011.01)

(52) U.S. Cl.
CPC ........ *G06T 19/20* (2013.01); *A61C 2007/004* (2013.01); *G06T 2200/24* (2013.01); *G06T 2207/30036* (2013.01); *G06T 2210/12* (2013.01); *G06T 2210/41* (2013.01); *G06T 2219/2021* (2013.01)

(58) Field of Classification Search
CPC ....... G06T 2207/30036; G06T 2210/12; G06T 2210/41; G06T 2219/2021; G06T 7/13; G06T 19/00; G06T 2219/004; G06T 1/00; A61C 7/002; A61C 2007/004; A61C 9/0053; A61B 5/00; G06F 3/0481; G06F 3/0484; G16H 30/00
See application file for complete search history.

(56) References Cited

U.S. PATENT DOCUMENTS

| | | | | |
|---|---|---|---|---|
| 11,583,367 | B2 | 2/2023 | Elias | |
| 11,612,324 | B2 | 3/2023 | Van Der Poel | |
| 11,896,455 | B2 | 2/2024 | Chen | |
| 2008/0311537 | A1 | 12/2008 | Minagi | |
| 2011/0104630 | A1 | 5/2011 | Matov | |
| 2015/0210014 | A1 | 7/2015 | Hultgren | |
| 2015/0238290 | A1 | 8/2015 | Wouters et al. | |
| 2015/0238345 | A1 | 8/2015 | Decker | |
| 2015/0245890 | A1 | 9/2015 | Wouters | |
| 2018/0235437 | A1 | 8/2018 | Ozerov | |
| 2022/0087793 | A1 | 3/2022 | Sisson | |
| 2022/0246270 | A1 | 8/2022 | Alvarez | |
| 2025/0186169 | A1* | 6/2025 | Cramer | G16H 20/30 |
| 2026/0074046 | A1* | 3/2026 | Li | A61C 13/34 |
| 2026/0195893 | A1* | 7/2026 | Sabina | G06T 7/0012 |

FOREIGN PATENT DOCUMENTS

| | | | |
|---|---|---|---|
| JP | 6868255 | B2 | 5/2021 |
| KR | 20100013822 | | 2/2010 |
| KR | 10-2015-0055017 | A | 5/2015 |
| KR | 20150055015 | | 5/2015 |
| KR | 20160015460 | | 2/2016 |
| KR | 101613159 | B1 | 4/2016 |
| KR | 1020180090308 | | 8/2018 |
| KR | 101994396 | B1 | 6/2019 |
| KR | 102085852 | B1 | 3/2020 |
| KR | 102093593 | | 3/2020 |
| KR | 102121963 | B1 | 6/2020 |
| KR | 20200066293 | | 6/2020 |
| KR | 20210027899 | | 3/2021 |
| KR | 102314890 | B1 | 10/2021 |
| KR | 1020220045763 | | 4/2022 |
| KR | 10-2022-0054095 | A | 5/2022 |
| KR | 20220072341 | | 6/2022 |
| WO | 2013-012969 | A2 | 1/2013 |
| WO | 2020234411 | | 11/2020 |
| WO | 2021-110938 | A1 | 6/2021 |

OTHER PUBLICATIONS

Boise Prosthodontics, "Occlusal Night Guard Design and Print Using Exocad and Formlabs 2", Youtube, (Jan. 28, 2019), URL: https://www.youtube.com/watch?v=bp9tnvqbxfc (Retrieved Dec. 22, 2025) 2 pages.

3shape Training Videos, "Working with 3Shape Splint Studio", Youtube, (Aug. 10, 2020), URL: https://www.youtube.com/watch?v=zj1yYGswvHo (Retrieved Dec. 22, 2025) 2 pages.

Extended European Search Report issued in EP23840006.3, (Jan. 29, 2026), 17 pages.

Exocad wiki, Hardware Requirements, Feb. 4, 2022 (Year: 2022), https://wiki.exocad.com/wiki/index.php/Hardware_Requirementst# Software_Requirements.

* cited by examiner

【FIG. 1】
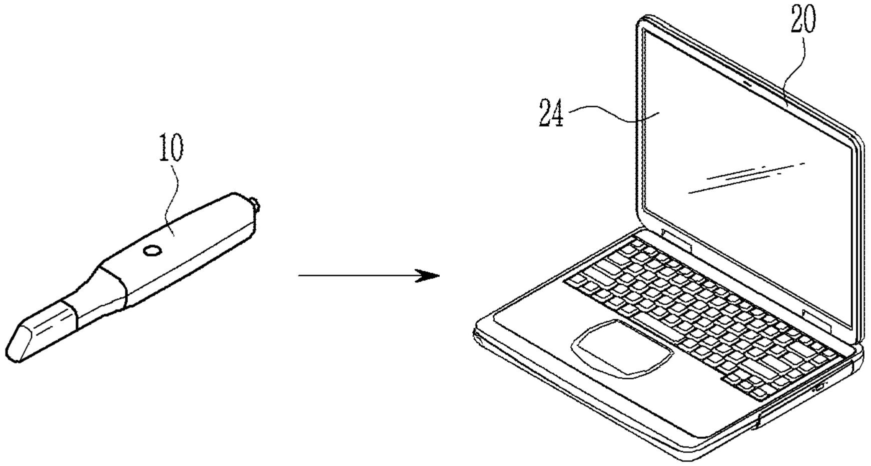
【FIG. 2】
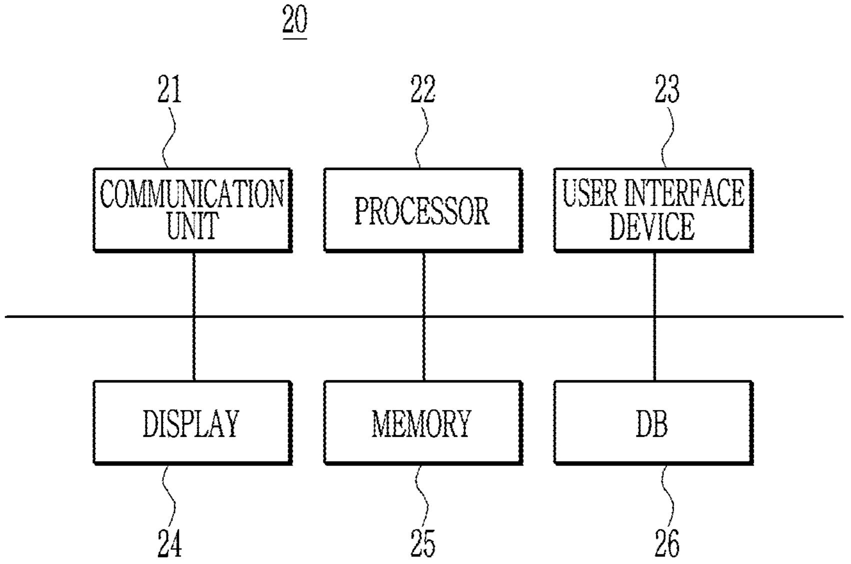

【FIG. 3】
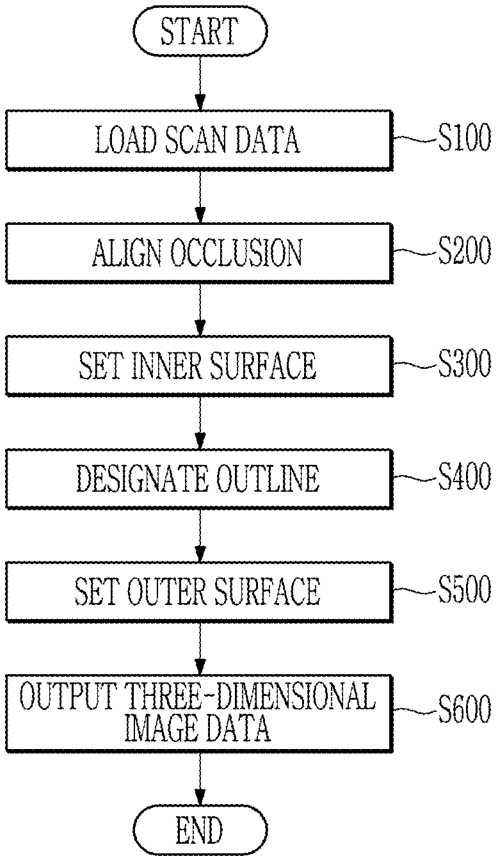

【FIG. 4】
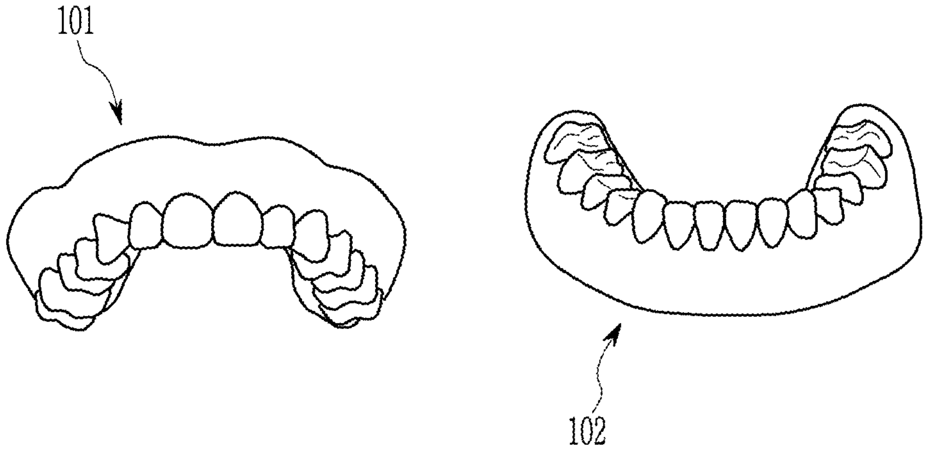
【FIG. 5】
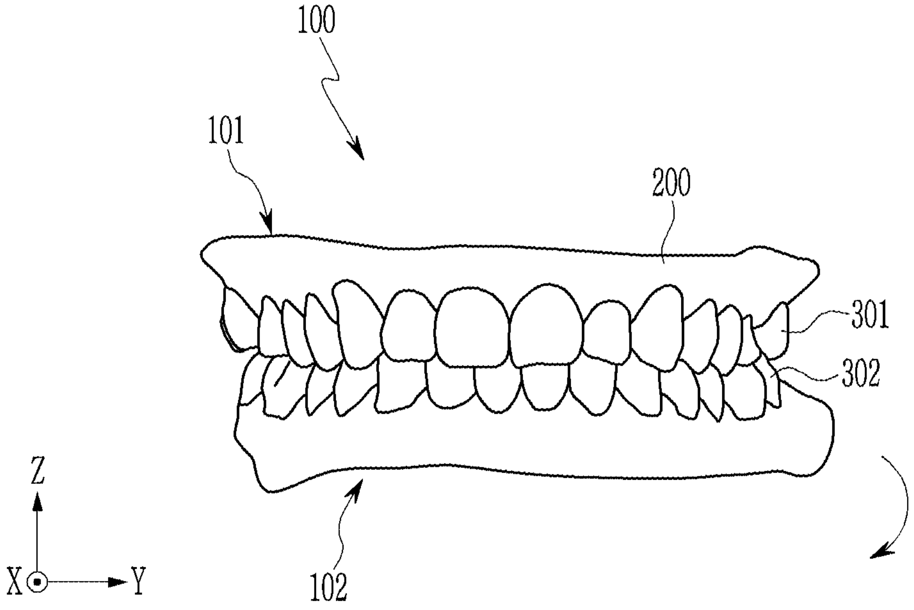

【FIG. 6】
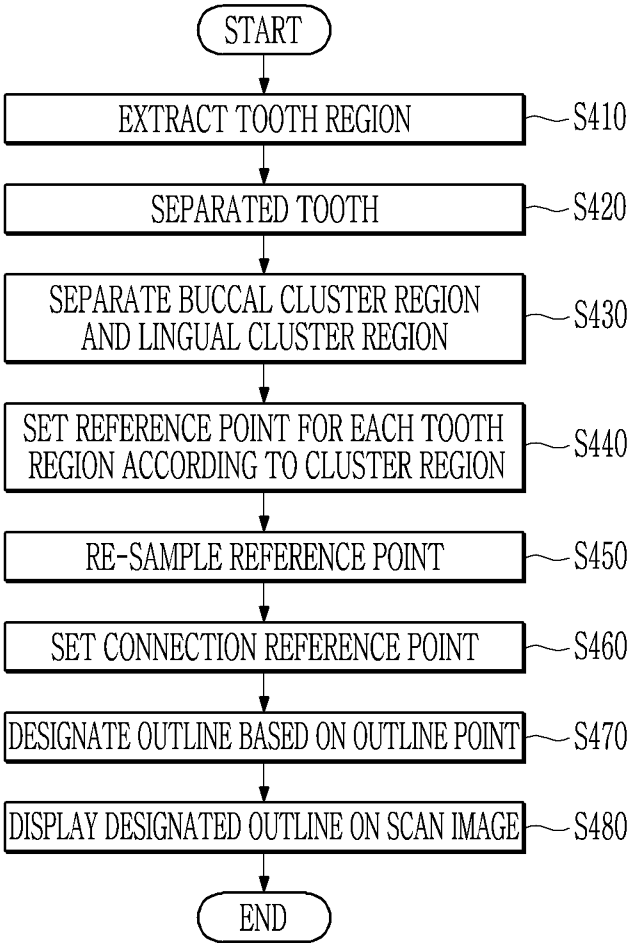

【FIG. 7】
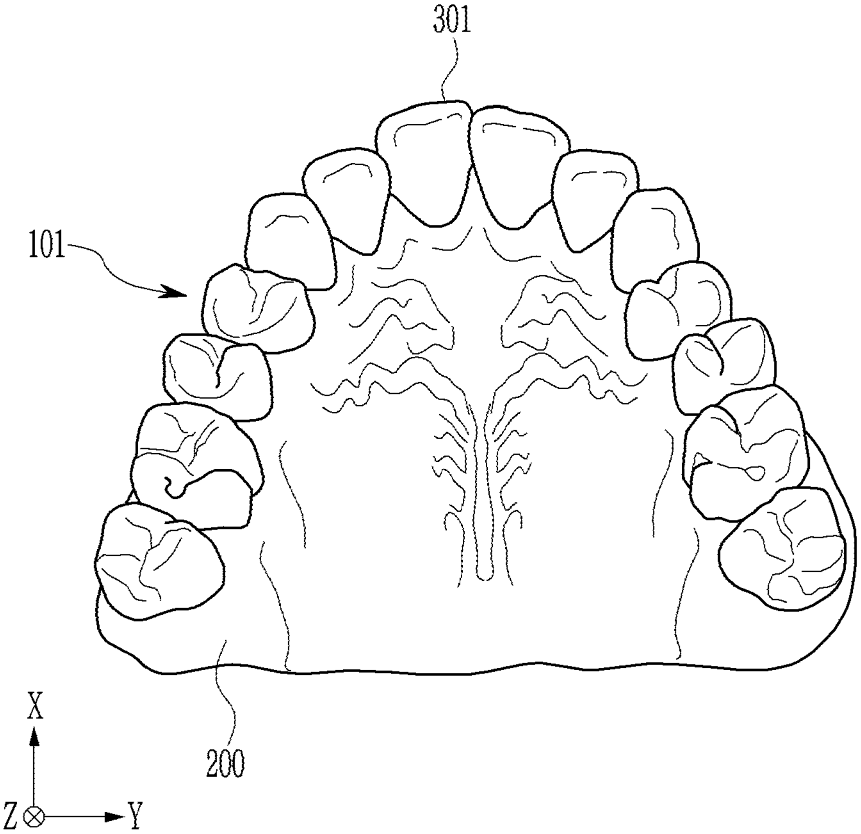

【FIG. 8】
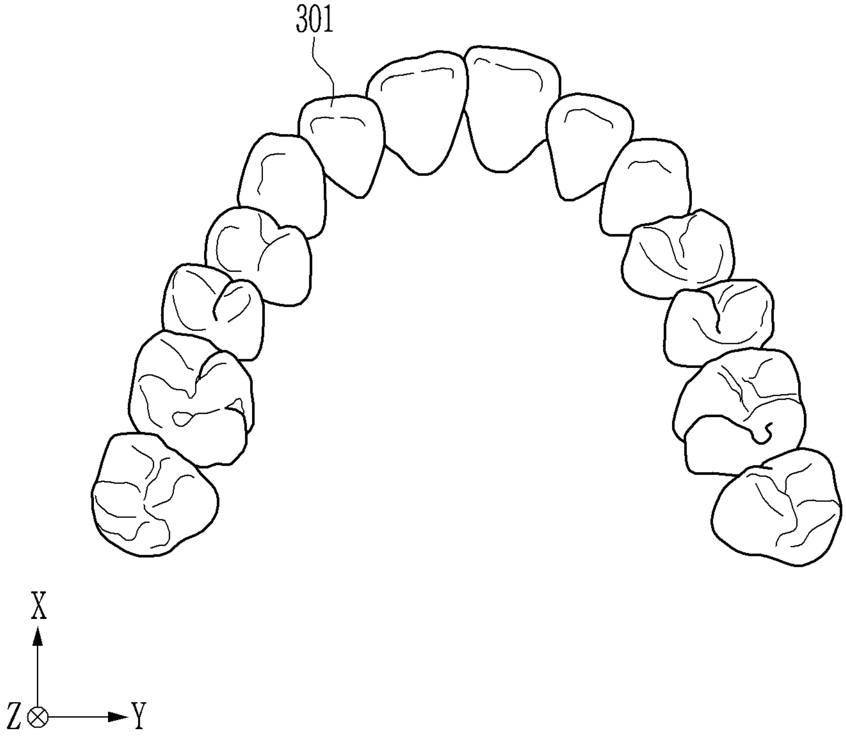

【FIG. 9】
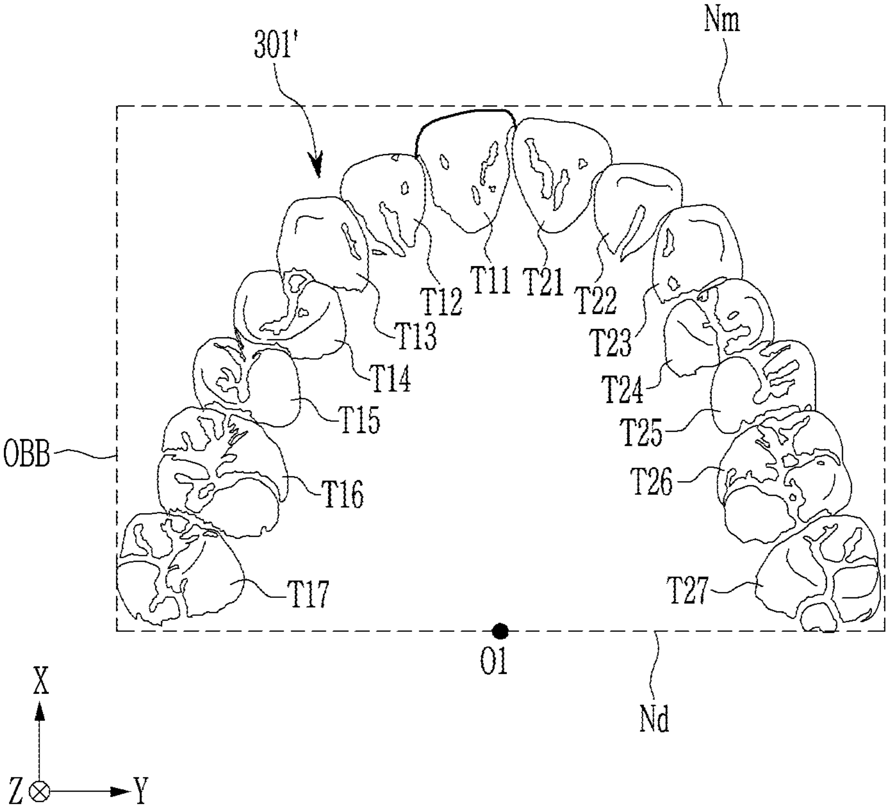

【FIG. 10】
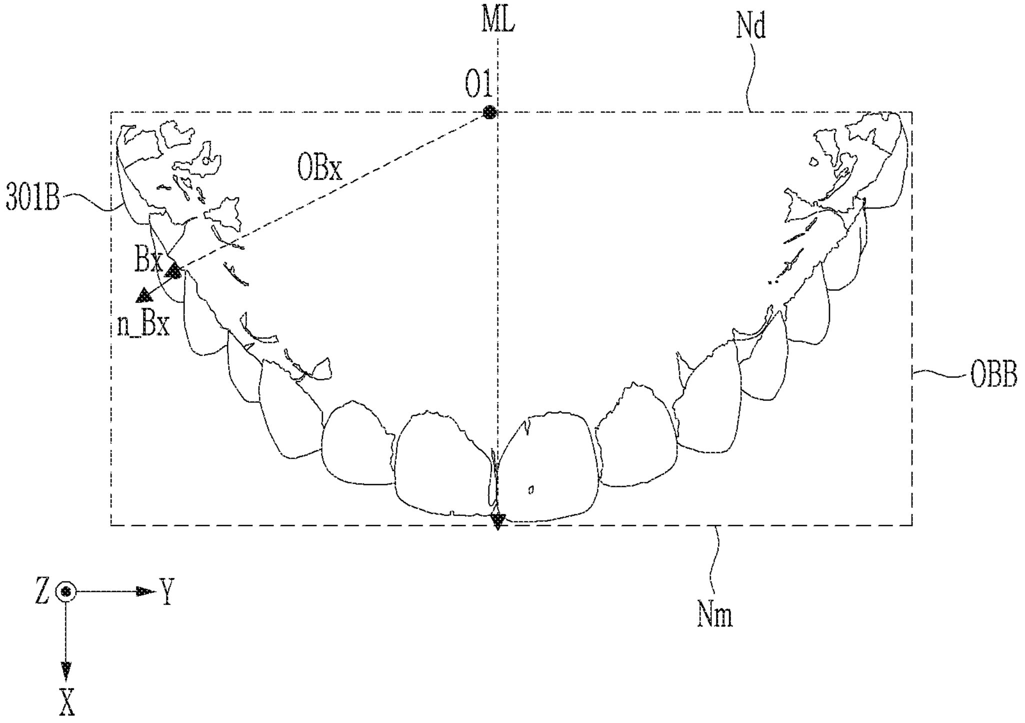

【FIG. 11】
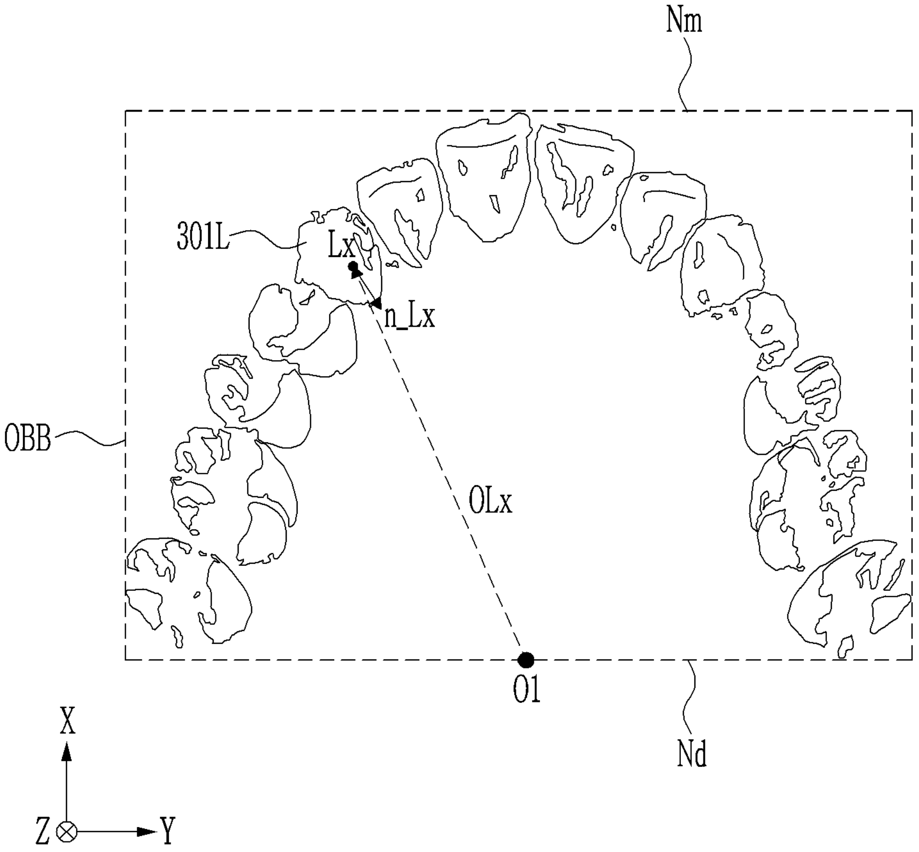

【FIG. 14】
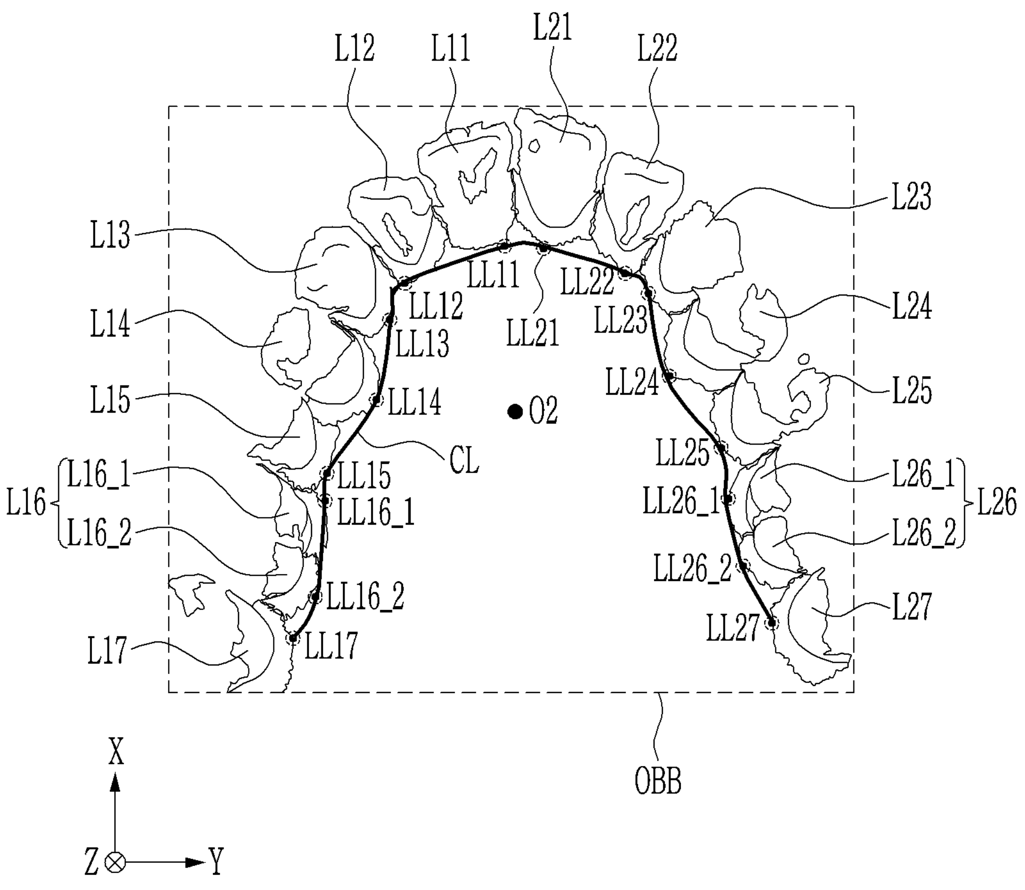

【FIG. 15】
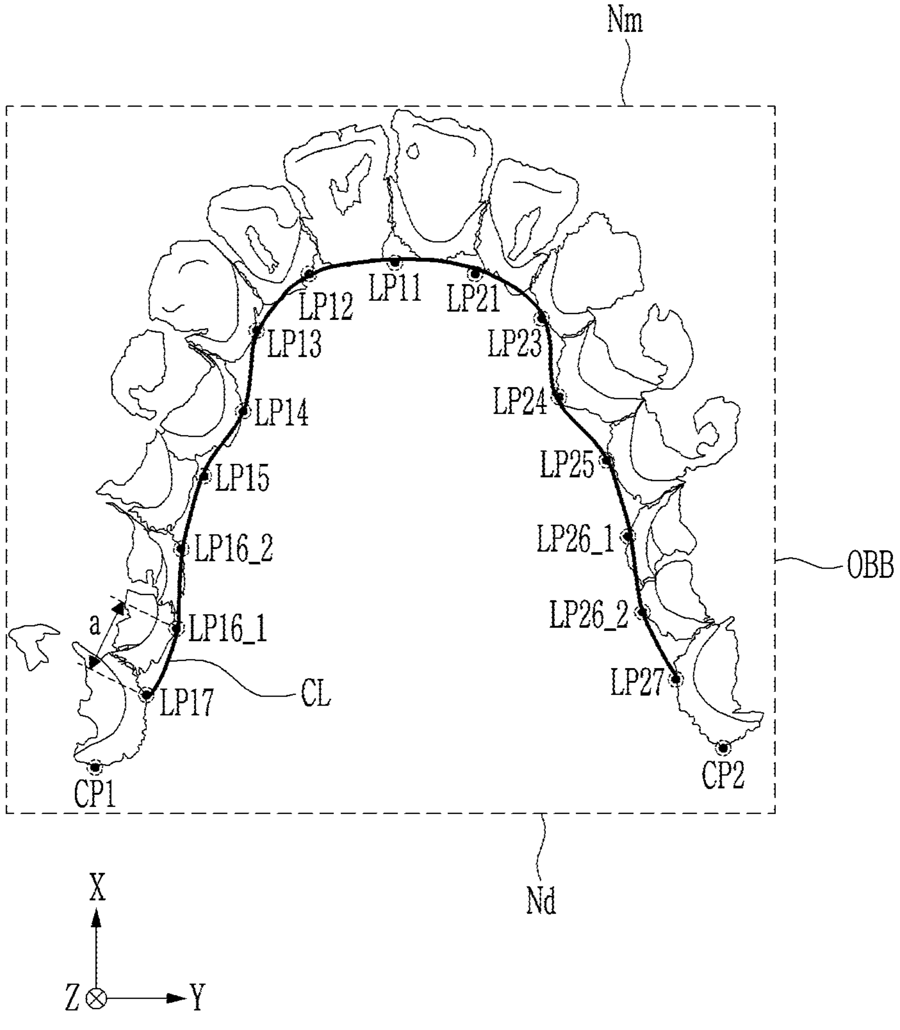

【FIG. 16】
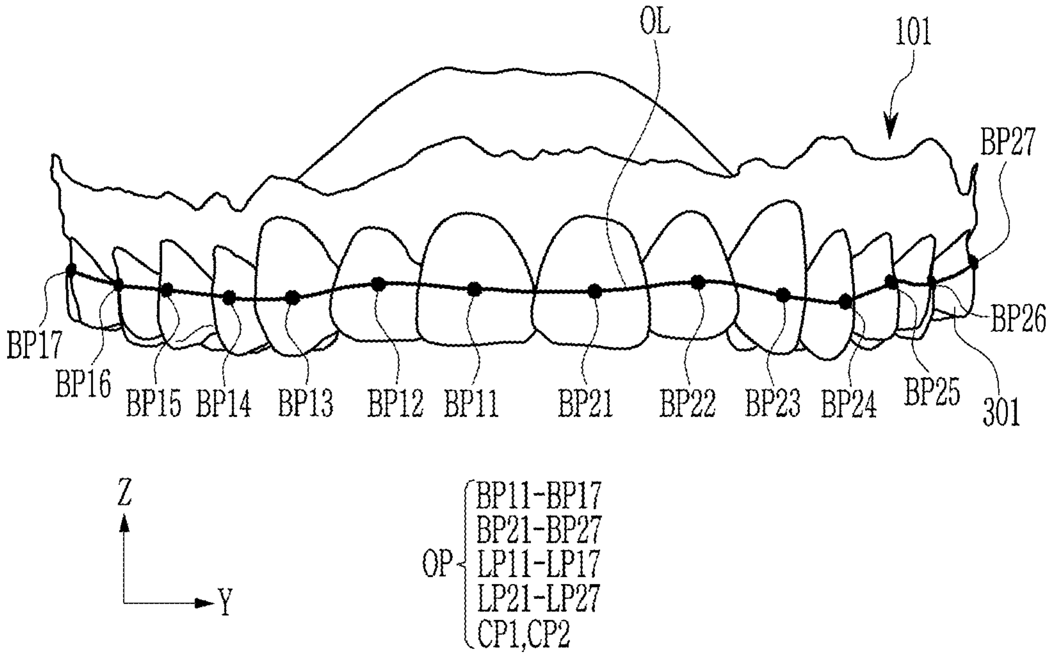

【FIG. 17】
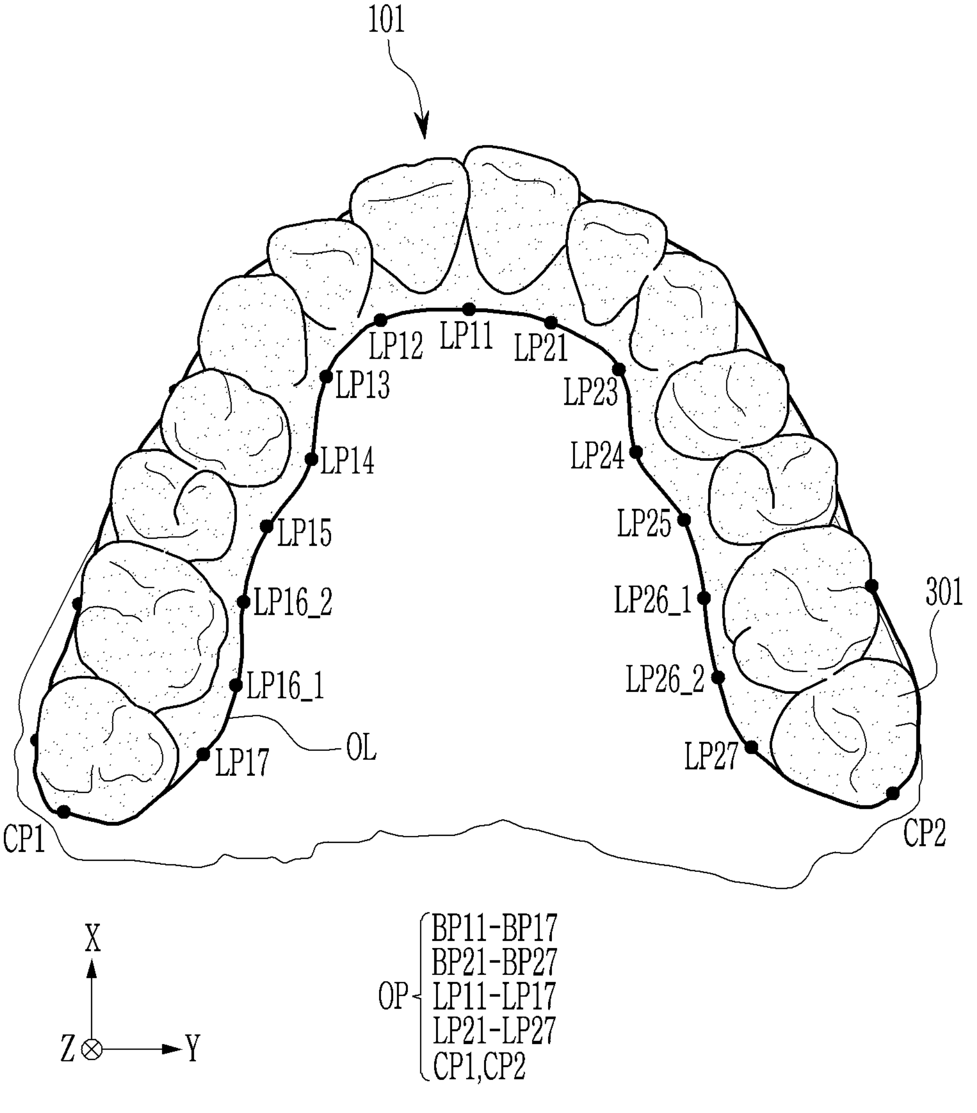

METHOD FOR PROCESSING IMAGE, AN ELECTRONIC APPARATUS AND A COMPUTER READABLE STORAGE MEDIUM

TECHNICAL FIELD

The present disclosure relates to a method for processing an image, an electronic apparatus, and a computer readable storage medium.

BACKGROUND ART

In cases where the temporomandibular joint is fatigued and temporomandibular joint disorder is caused due to improper occlusion, a splint, an orthodontic device, may be used to induce a stable central relation regardless of the malocclusion.

To manufacture the splint, it is necessary to designate a splint outline on an intraoral image and cut out an outer region of the splint outline to create a base shape of the splint.

However, since the operation of designating the splint outline requires a user to manually use a cursor or the like on intraoral scan data, there is a problem in that the operation of designating the splint outline suitable for the manufacturing of the splint may cause user fatigue and reduce the expertise and accuracy of splint manufacturing.

DISCLOSURE

Technical Problem

The present disclosure attempts to automatically designate a splint outline in consideration of characteristics of scan data to increase the efficiency of splint manufacturing.

The disclosed exemplary embodiments attempt to automatically designate a splint outline to increase a user's convenience in splint manufacturing.

Technical Solution

According to an exemplary embodiment, a method for processing an image includes: receiving at least one intraoral image; setting a plurality of outline points for the at least one intraoral image; and displaying an outline designated based on the plurality of outline points on the at least one intraoral image.

According to another exemplary embodiment, an electronic apparatus includes a user interface device, a processor, and a memory storing instructions executable by the processor, in which the processor executes the instructions to receive at least one intraoral image, set a plurality of outline points for the at least one intraoral image, and display an outline designated based on the plurality of outline points on the intraoral image.

According to still another exemplary embodiment, there is provided a computer readable storage medium including computer readable instructions, in which the instructions cause the computer to receive at least one intraoral image, set a plurality of outline points for the at least one intraoral image, and display an outline designated based on the plurality of outline points on the intraoral image.

Advantageous Effects

According to the disclosed exemplary embodiments, it is possible to increase the accuracy and convenience in splint manufacturing by automatically designating the splint outline.

According to the disclosed embodiments, it is possible to reduce the user's fatigue by reducing the unnecessary manual manipulation operation to designate the splint outline.

DESCRIPTION OF THE DRAWINGS

FIG. 1 is a diagram for describing an image processing system including an electronic apparatus according to an exemplary embodiment.

FIG. 2 is a block diagram illustrating a configuration of an electronic apparatus according to an exemplary embodiment.

FIG. 3 is a flowchart illustrating a method for processing an image of an electronic apparatus according to an exemplary embodiment.

FIGS. 4 and 5 are diagrams for describing scan data, maxillary scan data, and mandibular scan data according to an exemplary embodiment.

FIG. 6 is a flowchart illustrating a method for processing an image of an electronic apparatus according to an exemplary embodiment.

FIGS. 7 and 8 are diagrams for describing a step of extracting a tooth region according to an exemplary embodiment.

FIG. 9 is a diagram for describing a step of separating a tooth in a tooth region according to an exemplary embodiment.

FIGS. 10 and 11 are diagrams for describing a step of separating a separated tooth region into a buccal cluster region and a lingual cluster region according to an exemplary embodiment.

FIG. 14 is a diagram for describing a step of setting a plurality of reference points for a lingual cluster region according to an exemplary embodiment.

FIG. 15 is a diagram for describing a step of setting a plurality of re-sampling reference points and connection reference points for the lingual cluster region according to an exemplary embodiment.

FIGS. 16 and 17 are diagrams for describing a step of designating an outline and a step of displaying a designated outline according to an exemplary embodiment.

MODE FOR INVENTION

Figure 12:
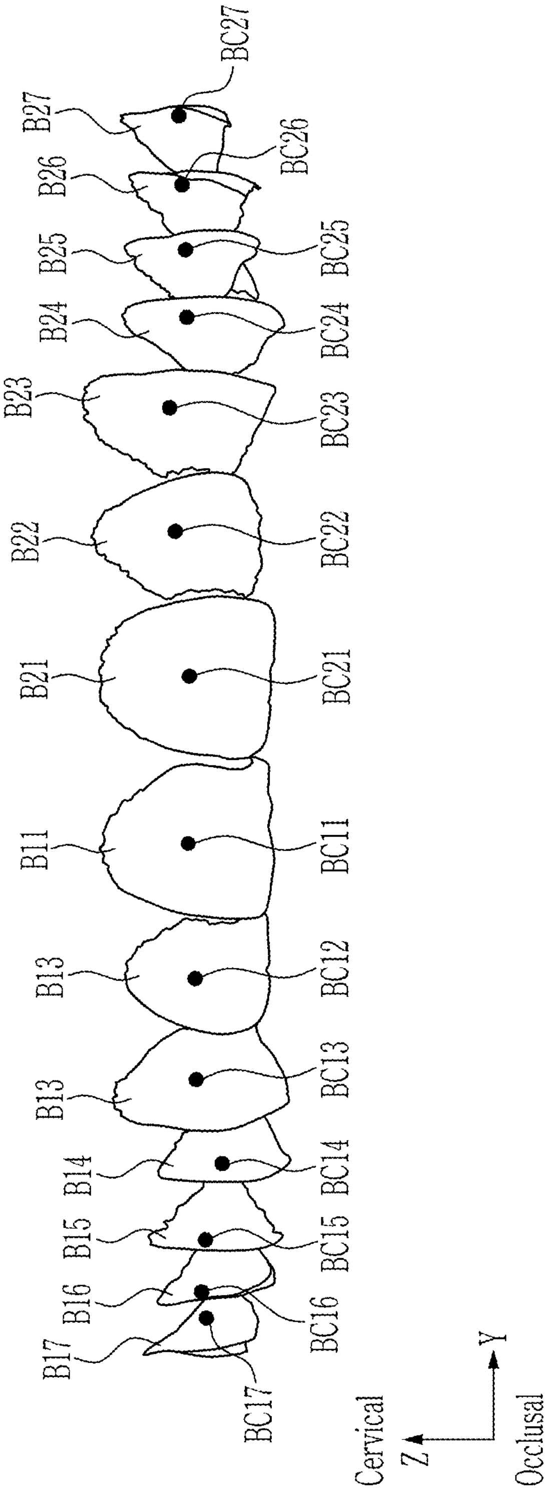
FIGS. 12 and 13 are diagrams for describing a step of setting a plurality of reference points for the buccal cluster region according to an exemplary embodiment.

Hereinafter, exemplary embodiments of the present invention will be described in detail with reference to the accompanying drawings so that those skilled in the art to which the present invention pertains may easily practice the present invention. The present invention may be implemented in various different forms and is not limited to exemplary embodiments provided herein.

Portions unrelated to the description will be omitted in order to obviously describe the present invention, and similar components will be denoted by the same reference numerals throughout the present specification.

In addition, the size and thickness of each component illustrated in the drawings are arbitrarily indicated for convenience of description, and the present invention is not necessarily limited to the illustrated those. In the drawings, the thickness of layers, films, panels, regions, etc., are exaggerated for clarity. In addition, in the accompanying drawings, thicknesses of some of layers and regions have been exaggerated for convenience of explanation.

In addition, it will be understood that when an element such as a layer, a film, a region, or a plate is referred to as being "on" another element, it can be directly on the other element or intervening elements may also be present. In contrast, when an element is referred to as being "directly on" another element, there are no intervening elements present. In addition, when an element is referred to as being "on" a reference element, it can be positioned on or beneath the reference element, and is not necessarily positioned on the reference element in an opposite direction to gravity.

In addition, unless explicitly described to the contrary, the word "comprise", and variations such as "comprises" or "comprising", will be understood to imply the inclusion of stated elements but not the exclusion of any other elements.

Further, throughout the specification, the word "plane" refers to a view when a target is viewed from the top, and the word "cross section" refers to a view when a cross section of a target taken along a vertical direction is viewed from the side.

In addition, terms including an ordinal number such as first, second, or the like, used in the present disclosure may be used to describe various components. However, these components are not limited to these terms. The above terms are used solely for the purpose of distinguishing one component from another.

FIG. 1 is a diagram for describing an image processing system including an electronic apparatus according to an exemplary embodiment. FIG. 2 is a block diagram illustrating a configuration of an electronic apparatus according to an exemplary embodiment.

Referring to FIG. 1 and FIG. 2, a system 1 for processing an image may include a scanner 10 and an electronic apparatus 20.

In this specification, an 'object' is a capturing subject and may include a person, an animal, or a part thereof. For example, the object may include a part (an organ, an organ, etc.) of a body, a phantom, etc. In addition, for example, the object may include a plaster model modeling an oral cavity, a denture such as a denture or a prosthesis, a dentiform in a shape of teeth, etc. For example, the object may include a tooth, a gingiva, at least a portion of the oral cavity, and/or artificial structures (e.g., an orthodontic device including bracket and wire, dental restorations including implant, abutment, artificial teeth, inlay and onlay, and orthodontic auxiliary tools inserted into the oral cavity, etc.) that may be inserted into the oral cavity, the tooth or gingiva to which the artificial structures are attached, etc.

The scanner 10 may mean a device that acquires an image related to the object. The scanner 10 may mean a scanner 10 that acquires an intraoral image related to the oral cavity used for oral treatment. The scanner 10 may acquire at least one of a two-dimensional (2D) image and a three-dimensional (3D) image. In addition, the scanner 10 may acquire at least one 2D image of the oral cavity, and generate a 3D image (or a 3D model) of the oral cavity based on at least one acquired 2D image. In addition, the scanner may acquire at least one two-dimensional image of the oral cavity, and transmit the at least one two-dimensional image to the electronic apparatus 20.

The electronic apparatus 20 may also image a surface of at least one of the scanner 10 tooth model or tooth, a gingiva, and the artificial structures (e.g., the orthodontic device including the bracket and wire, the orthodontic auxiliary tools inserted into the oral cavity including the implant, the artificial teeth, and splint, etc.) insertable into the oral cavity, and for this purpose, may acquire surface information about the object as raw data.

The electronic apparatus 20 may generate the 3D image of the oral cavity based on at least one received 2D image. Here, the '3D image' may be generated by three-dimensionally modeling the object based on the received raw data, and thus may be called a '3D model'. In addition, in the present disclosure, a model or image representing an object two-dimensionally or three-dimensionally may be collectively called an 'image'.

For example, the scanner 10 may be an intraoral scanner having a form that may be inserted into the oral cavity, and according to the exemplary embodiment, the intraoral scanner may be a wired device or a wireless device, and the technical idea of the present disclosure is not limited to the form of the intraoral scanner.

According to an exemplary embodiment, the intraoral scanner may be a hand-held type scanner that can be held by hand and carried. The intraoral scanner may be inserted into the oral cavity, and scan teeth in a non-contact manner to obtain an image of the oral cavity including at least one tooth, and scan the inside of the patient's oral cavity using at least one image sensor (e.g., an optical camera, etc.).

According to an exemplary embodiment, the scanner 10 may be a table type scanner that may be used for dental treatment. The table type scanner may be a scanner that acquires the surface information on an object as the raw data by scanning the object using the rotation of the table. The table scanner may scan a surface of an object such as a plaster model or an impression model modeling the oral cavity.

The electronic apparatus 20 may receive the raw data from the scanner 10 and process the received raw data to output a 3D image for the raw data. According to an exemplary embodiment, the output 3D image may be 3D image data including prosthesis such as the splint for the received raw data. For ease of description, a specific description of the scan data is described later with reference to FIGS. 4 and 5.

The electronic apparatus 20 may be any electronic apparatus that is connected to the scanner via a wired or wireless communication network, and may receive a 2D image acquired by scanning the object from the scanner and generate, process, display, and/or transmit an image based on the received 2D image.

The electronic apparatus 20 may store and execute dedicated software to perform at least one operation of receiving, processing, storing, and/or transmitting the 3D image or the 2D image of the object. For example, the dedicated software may perform processing operations such as area extraction and area setting on the received scan data, and perform data selection, reference point adjustment, alignment, etc., based on the processing operations to perform at least one operation such as generation, storing, and transmitting the splint 3D image for the scan data such as the splint. The electronic apparatus 20 may be a computing device such as a smart phone, a laptop computer, a desktop computer, a PDA, or a tablet PC, but is not limited thereto. In addition, the electronic apparatus 20 may exist in the form of a server (or server device) for processing intraoral images.

The electronic apparatus 20 may include a communication unit 21, a processor 22, a user interface device 23, a display 24, a memory 25, and a database 26. However, not all of the illustrated components are essential components. The electronic apparatus 20 may be implemented by more components than the illustrated components, or may be implemented by fewer components. The components will be described below.

The communication unit 21 may perform communication with an external device. Specifically, the communication unit 21 may be connected to a network by wire or wirelessly to perform communication with the external device. Here, the external device may be the scanner 10, a server, a smartphone, a tablet, a PC, etc.

The communication unit 21 may include a communication module that supports one of various wired and wireless communication methods. For example, the communication module may be in the form of a chipset, or may be a sticker/barcode (e.g., a sticker including an NFC tag), etc., including information necessary for communication. In addition, the communication module may be a short-range communication module or a wired communication module.

For example, the communication unit 21 may support at least one of wireless LAN, wireless fidelity, Wi-Fi direct, Bluetooth, Bluetooth low energy, wired LAN, near field communication, Zigbee, Infrared data association (IrDA), 3G, 4G, and 5G.

In an exemplary embodiment, the scanner 10 may transmit the acquired raw data to the electronic apparatus 20 through the communication module. The image data acquired by the scanner may be transmitted to the electronic apparatus 20 connected through the wired or wireless communication network.

The processor 22 controls the overall operation of the electronic apparatus 20 and may include at least one processor, such as a CPU. The processor 22 may include at least one specialized processor corresponding to each function, or may be a processor integrated into one.

The processor 22 may receive the raw data through the communication unit 21. For example, the processor 22 may receive the raw data from the scanner 10 through the communication unit 21. In this case, the processor 22 may generate the 3D image data (e.g., surface data, mesh data, etc.) that represents the shape of the surface of the object three-dimensionally based on the received raw data. Hereinafter, the scan data that becomes the calculation target of the electronic apparatus 20 may include the 3D image data.

The processor 22 may receive library data from the external device through the communication unit 21. The library data may be data pre-stored in the electronic apparatus 20 or the raw data or the 3D image data acquired through the external device, but is not limited thereto. Here, the external device may be a camera capable of capturing pictures or videos, or an electronic apparatus having a camera function. In addition, the external device may be an intraoral scanner capable of scanning the inside of a patient's mouth.

The processor 22 may control the user interface device 23 or the display 24 to receive a predetermined command or data from a user.

The processor 22 may execute a program stored in the memory 25, read an image, data, or file stored in the memory 25, or store a new file in the memory 25. The processor 22 may execute instructions stored in the memory 25. The stored program may include, but is not limited to, dedicated software.

The processor 22 may perform a calculation operation on mesh data, data, etc., included in the scan data. For example, the processor 22 may extract a normal vector of the mesh data constituting the scan data, or compare directions of vectors by performing a dot product operation between vectors, and generate a 3D-oriented bounding box including a plurality of mesh data or a plurality of vertices.

The 3D-oriented bounding box means a box of a minimum size that surrounds a plurality of position data or a specific object, and the 3D-oriented bounding box may be in the form of a rectangular shape, but is not limited thereto.

The processor 22 may set a reference point based on a distance from a specific point. For example, the processor 22 may set a reference point that is arranged at a predetermined distance from the bottom surface of the plurality of separated tooth regions, set the closest point as a reference point based on one center point for each of a plurality of separated tooth regions, or may set the closest point in a specific direction to one surface or a specific region as a reference point. In addition, the processor 22 may perform the resampling operation so that the reference points may be arranged at regular intervals based on the intervals between the reference points, but the operation of the processor 22 is not limited to the operation example.

In addition, the processor 22 may perform the outline designation operation for the image by connecting the plurality of set reference points with a curve.

The processor 22 may recognize an object in the scan data, extract a portion of an area, or calculate the area or volume of the recognized object or the extracted area. For example, the processor 22 may separately recognize the type of teeth by using a curvature information, cusp information, etc., of the scan data, or distinguish a space between teeth. According to an exemplary embodiment, the recognition operations of the processor 22 are not limited to the examples of utilizing the information, and the recognition operations may be performed through the inference of the object recognition artificial intelligence algorithm. The cusp information may include the number and arrangement of cusp points where a molar in the scan data come into contact.

The user interface device 23 may mean a device that receives data from a user to control the electronic apparatus 20. The display 24 may include an output device for displaying a result image according to the operation of the electronic apparatus 20 or the 3D image output from the electronic apparatus 20.

The user interface device 23 may include, for example, an input device such as a mouse, a joystick, an operation panel, a touch sensitive panel that receives user input, and the display 24 may include a display panel that displays a screen, etc.

The memory 25 may store software or a program, and the stored software or program may be dedicated software, but is not limited thereto. The memory 25 may store at least one instruction for executing an operation method of the electronic apparatus 20 that calls scan data and designates and displays the splint outline for the scan data, and the information on the designated splint outline.

The database 26 may store data and a dataset for training an artificial intelligence algorithm of dedicated software, and may provide data for training according to a request of the dedicated software. The artificial intelligence algorithm may train the training data of teeth stored in the database 26 using a deep learning method and distinguish the characteristics of data representing teeth. Meanwhile, the dedicated software may use the extracted or recognized tooth region data when performing an occlusal plane alignment step, an inner setting step, an outline designation step, etc., which will be described later, by extracting maxillary tooth region data and mandibular tooth region data from scan data or recognizing objects according to tooth characteristics.

In the present disclosure, the artificial intelligence (AI) means a technology that imitates human learning ability, reasoning ability, and perception ability and implements them with a computer, and may include the concepts of machine learning and symbolic logic. The machine learning (ML) may be an algorithm technology that classifies or trains the characteristics of input data on its own. The technology of the artificial intelligence may analyze input data as the machine learning algorithm, train the results of the analysis, and make the judgment or prediction based on the results of the training. In addition, technologies that imitate the cognitive and judgment functions of the human brain by utilizing the machine learning algorithm may also be understood as part of the category of the artificial intelligence. For example, the fields of technology of linguistic understanding, visual understanding, inference/prediction, knowledge expression, and motion control may be included.

In this disclosure, the machine learning may mean a process of training a neural network model using experience in processing data. Through the machine learning, the computer software may mean improving its own data processing ability. A neural network model is constructed by modeling correlations between data, and the correlations may be expressed by multiple parameters. The neural network model extracts and analyzes features from given data to derive correlations between data, and repeats the process to optimize the parameters of the neural network model, which may be called the machine learning.

For example, the neural network model may train a mapping (correlation) between inputs and outputs for data given as input-output pairs. Alternatively, even when only the input data is given, the neural network model may derive regularities between the given data and train the relationship.

In the present disclosure, the artificial intelligence training model, the machine learning model, or the neural network model may be designed to implement a human brain structure on a computer, and may include a plurality of network nodes that simulate neurons of a human neural network and have weights. The plurality of network nodes may simulate synaptic activity of neurons that exchange signals through synapses, and thus may have a connection relationship between each other. In the artificial intelligence learning model, the plurality of network nodes may be located in layers of different depths and may exchange data according to the convolution connection relationship.

Although the database 26 is illustrated as being included in the electronic apparatus 20 in the drawing, it is not limited thereto and may be arranged in the form of a server (or server device) or the like outside the electronic apparatus 20 to provide data for training and store training results.

FIG. 3 is a flowchart illustrating a method for processing an image of an electronic apparatus according to an exemplary embodiment. FIGS. 4 and 5 are diagrams for describing scan data, maxillary scan data, and mandibular scan data according to an exemplary embodiment.

Referring to FIGS. 1 to 5, the electronic apparatus 20 loads scan data 100 (S100). The electronic apparatus 20 loads the scan data 100 generated based on the image received from the external device including the scanner 10, etc., through the communication unit 21.

The electronic apparatus 20 loads scan data 100 processed based on the received image or pre-stored in the processor 22 or the user interface device 23, and may display the loaded scan data 101 through the display 24.

The scan data 100 may be the 2D image of the object, the 3D model representing the object in three dimensions, or the 3D image data, and specifically, may be a 3D intraoral model. According to an exemplary embodiment, the intraoral images in FIGS. 4 and 5 correspond to the scan data 100 and are 2D or 3D expressions of the objects of the scan data 100, and may include a maxillary pre-preparation (prep) image, a maxillary prep image, a mandibular pre-prep image, a mandibular prep image, an occlusal image including a maxillary-related image and a mandibular-related image, as in the scan data 100 described below.

In the present disclosure, the prep may mean a series of preparatory processes for removing a portion of the enamel and dentin of the teeth so as to prevent interference between natural teeth and splints when performing prosthetics such as crowns and bridges.

A "3D intraoral model" may mean a model that three-dimensionally models the oral cavity based on the raw data acquired by the scanning operation of the scanner. In addition, the "3D intraoral model" may mean a structure that is three-dimensionally modeled based on the data acquired by scanning an object such as a tooth, an impression, and an artifact. The 3D intraoral model is generated by modeling the internal structure of the oral cavity in three dimensions, and may be called a 3D scan model, a 3D model, or a tooth model. For example, a format of the 3D intraoral model may be one of standard triangle language (STL), OBJ, and polygon file formats, and is not limited to the above examples. In addition, the 3D intraoral model may include information such as geometric information, color, texture, and a material for a 3D shape.

In addition, the "polygon" may mean a polygon which is the smallest unit used when expressing the 3D shape of the 3D intraoral model. For example, the surface of the 3D intraoral model may be expressed as triangular polygons. For example, a polygon may be composed of at least three vertices and one face. A vertex may include information such as location, color, and normal. A mesh may be an object in a 3D space created by gathering multiple polygons. As the number of polygons representing the 3D intraoral model increases, the object may be expressed in detail.

The scan data 100 may include at least one of the maxillary scan data 101 and the mandibular scan data 102. Specifically, the scan data 100 may load any one of the maxillary prep data, the maxillary preparation data, the mandibular prep data, the mandibular preparation data, and the occlusal data including the maxillary-related data and the mandibular-related data.

In the present disclosure, the prep data may be data in which the enamel and dentin of the tooth are removed through the preparatory process, and the pre-prep data may be data before a portion of the enamel and dentin of the tooth are removed through the preparatory process.

The scan data 100 may include gingival region 200, maxillary tooth region data 301, and mandibular tooth region data 302, which are arranged in the maxillary scan data 101 and the mandibular scan data 102.

The electronic apparatus 20 may load at least one of the maxillary scan data 101, the mandibular scan data 102, and the occlusal data including the maxillary scan data 101 and the mandibular scan data 102.

The electronic apparatus 20 analyzes and aligns the shape of the received scan data 100 (S200). In the corresponding step, an occlusal plane and a midline for the scan data 100 are set, and the electronic apparatus 20 may automatically align the scan data 100, the maxillary scan data 101, or the mandibular scan data 102 according to the occlusal plane, and may display the left and right alignment by a midline through the display 24.

In addition, at the corresponding stage, the user may manually designate a reference point on the scan data 100 to set the front direction and the occlusal plane of the scan data 100, and align the scan data 100 along the set occlusal plane.

For example, the user may select some data of the scan data 100 through the user interface device 23 at the corresponding step, and align the scan data 100 with the selected data as a reference point.

The electronic apparatus 20 sets the inner surface of the splint for the aligned scan data 100 (S300).

In the corresponding step, the electronic apparatus 20 may designate the direction in which the splint is to be inserted by considering the undercut of the aligned scan data 100. For example, when manufacturing the splint, the electronic apparatus 20 may calculate the area of the tooth region in the scan data 100, and designate the direction in which the splint is to be inserted by considering the undercut and block out according to the direction in which the splint is to be inserted. The insertion efficiency and retention force of the splint may be improved by designating the insertion direction of the splint as described above.

Based on the inner surface offset distance, the surface smoothness, etc., input from the user interface device 23, the electronic apparatus 20 may set the inner surface of the splint to be output. The inner surface offset distance may mean a separation distance in the normal direction between the scan data 100 and the inner surface of the splint. The surface smoothness may mean the roughness of the inner surface of the splint.

The electronic apparatus 20 designates the outline of the splint for the automatically aligned scan data 100 (S400).

Based on the buccal height, the lingual height, etc., input from the user interface device 23, the electronic apparatus 20 may designate the outline of the splint to be output. For example, when manufacturing the splint, the buccal height is a height of the outer wall of the tooth facing a cheek based on a lower surface of the tooth region, and for example, the buccal height may mean a height formed along the outer wall of the tooth based on the bottom surface of the tooth region of the maxillary scan data 101. The higher the buccal height, the closer the buccal outline formed is to the gingiva. The lingual height is a height of the inner wall of the tooth facing a tongue based on a bottom surface of the tooth region, and for example, the lingual height may mean a height formed along the inner wall of the tooth based on the bottom surface of the tooth region of the maxillary scan data 101. The higher the lingual height, the closer the lingual outline formed is to the gingiva. A specific description of the corresponding step will be described later in the description of FIGS. 6 to 17.

The electronic apparatus 20 sets the outer surface of the splint for the aligned scan data 100 (S500).

Based on the thickness, the surface smoothness, etc., input from the user interface device 23, the electronic apparatus 20 may designate the outer surface of the splint to be output. The electronic apparatus 20 may form the 3D image for the splint by setting the thickness of the splint in the occlusal direction based on the predetermined occlusal thickness. For example, when manufacturing the splint, the thickness may mean the thickness from the inner surface of the splint in the buccal/lingual direction. The surface smoothness may mean the roughness of the outer surface of the splint. The predetermined occlusal thickness may mean the maximum thickness value that the splint extends in the occlusal direction.

The electronic apparatus 20 generates the 3D image data including the splint through the information set and designated in steps S300 to S500 (S600). The 3D image of the generated splint may be transmitted to the external device through the communication unit 21 and output to the splint. The external device may be a 3D printer, but is not limited to the above example according to an exemplary embodiment.

According to an exemplary embodiment, the electronic apparatus 20 may perform steps S200 to S500 at once without an intermediate input from the user. The electronic apparatus 20 loads the scan data 100 (S100), receives inputs, such as the inner surface offset distance, the surface smoothness, the buccal height, the lingual height, and the thickness, from the user, and automatically performs steps S200 to S500 without intermediate intervention from the user to generate the 3D image data for the splint (S600).

According to an exemplary embodiment, the electronic apparatus 20 may automatically perform steps S200 to S500 without user intervention by utilizing the inner surface offset distance, the surface smoothness, the buccal height, the lingual height, the thickness, etc., stored in the memory 25.

The electronic apparatus 20 may automatically perform steps S200 to S500 without the user intervention, thereby reducing the time required for the splint manufacturing.

According to an exemplary embodiment, the electronic apparatus 20 may generate the 3D image data for the splint through an inference operation of the artificial intelligence algorithm without a separate input other than the loaded scan data 100 (S600). The artificial intelligence algorithm may perform training on the splint corresponding to the plurality of scan data before the inference operation, and perform the inference operation related to the 3D image data of the splint suitable for the loaded scan data 100.

According to an exemplary embodiment, the electronic apparatus 20 may adjust an occlusion state or a minimum distance between arches (distance to antagonist) in each step of steps S300 to S500 through the user input regarding the occlusion state or the minimum distance between the arches between the maxillary scan data 101 and the mandibular scan data 102 in the scan data 100. During the adjustment operation, the electronic apparatus 20 may perform the calculation operation on the scan data 100 to display the occlusion state or the minimum distance between the arches together.

Hereinafter, a method for processing an image of an electronic apparatus for designating a splint outline will be described with reference to FIGS. 6 to 17.

FIG. 6 is a flowchart illustrating a method for processing an image of an electronic apparatus according to an exemplary embodiment. FIGS. 7 and 8 are diagrams for describing a step of extracting a tooth region according to an exemplary embodiment.

Referring to FIGS. 1 to 6, the electronic apparatus 20 extracts the tooth region from the scan data 100 (S410).

The electronic apparatus 20 may select at least one of the scan data 100 including the maxillary scan data 101 and the mandibular scan data 102 prior to extracting the tooth region. According to an exemplary embodiment, the electronic apparatus 20 may select at least one of the scan data 100 through the input of the user interface device 23.

The electronic apparatus 20 may designate the splint outline based on the selected scan data 100, and then the splint may be manufactured based on the selected scan data 100, and the manufactured splint may be inserted into the oral cavity corresponding to the selected scan data 100.

Referring additionally to FIGS. 7 and 8, the electronic apparatus 20 may extract the maxillary tooth region 301 from the selected maxillary scan data 101. For example, as illustrated in FIG. 8, the electronic apparatus 20 may extract the maxillary tooth region 301 for the selected maxillary scan data 101. The extracted maxillary tooth region 301 may include some gingival portions very close to the teeth.

The electronic apparatus 20 may extract the tooth region by distinguishing the tooth region using the curvature information, the cusp information, etc., for the maxillary tooth region 301, or may extract the tooth region through the object recognition artificial intelligence algorithm. However, according to an exemplary embodiment, in the step S410, a portion of the gingiva 200 arranged in the lingual direction may be extracted together with the maxillary tooth region 301.

In the present invention, the method for processing the image of the electronic apparatus 20 is described mainly based on the application to the maxillary scan data 101, but the method for processing the image of the electronic apparatus 20 may be applied to the mandibular scan data 102 as well, without being limited thereto.

FIG. 9 is a diagram for describing a step of separating a tooth in a tooth region according to an exemplary embodiment.

Referring additionally to FIG. 9, the electronic apparatus 20 identifies the space between the maxillary tooth regions 301 and separates the maxillary tooth regions 301 into a plurality of separated tooth regions 301' (S420). The electronic apparatus 20 may recognize the type of teeth by utilizing the curvature information, the cusp information, etc., of the scan data, or may identify the space between the teeth.

According to an exemplary embodiment, the electronic apparatus 20 performs an inference operation on the maxillary tooth region 301 through the object recognition artificial intelligence algorithm to identify and recognize a tooth number for each tooth in the maxillary tooth region 301 and separate the recognized teeth, and separates the maxillary tooth region 301 into the plurality of separated tooth regions.

The plurality of separated tooth regions 301' may include a plurality of teeth T11 to T17 and T21 to T27 that are separated from each other. According to an exemplary embodiment, the electronic apparatus 20 may identify and delete mesh data having a negative curvature value in the maxillary tooth region 301 as a space between teeth so that the plurality of teeth T11 to T17 and T21 to T27 that are separated from each other are not connected to each other, and may delete some regions having a negative curvature inside the teeth, but is not limited thereto.

The electronic apparatus 20 divides the plurality of separated tooth regions 301' into the buccal cluster region and the lingual cluster region based on the direction of the normal vector within the plurality of separated tooth regions 301' (S430).

FIGS. 10 and 11 are diagrams for describing a step of separating a separated tooth region into a buccal cluster region and a lingual cluster region according to an exemplary embodiment.

Referring additionally to FIGS. 10 and 11, the electronic apparatus 20 may generate a 3D-oriented bounding box (OBB) including the mesh data of the plurality of separated tooth regions 301'.

The 3D-oriented bounding box (OBB) may include a mesial plane Nm and a distal plane Nd through which the midline ML generated in step S200 passes. The mesial plane Nm may be a plane that contacts a region corresponding to an anterior of the plurality of separated tooth areas 301', and the distal plane Nd may be a plane that contacts a region corresponding to a post of the plurality of separated tooth areas 301'. In the 3D-oriented bounding box (OBB) of the present disclosure, the distal plane Nd may be a plane that faces the mesial plane Nm, and the distal plane Nd and the mesial plane Nm may be arranged to be spaced apart from each other in the first direction X, but is not limited thereto.

The electronic apparatus 20 may separate the plurality of separated tooth regions 301' into a buccal cluster region 301B and a lingual cluster region 301L by comparing a direction of a progress vector OBx and OLx between a first center point O1, which is a center of a distal plane Nd, and a point Bx and Lx within the plurality of separated tooth regions 301' with a direction of normal vectors n_Bx and n_Lx of a point Bx and Lx within the plurality of separated tooth regions 301'. According to an exemplary embodiment, a normal vector of one point may be expressed as a normal vector for a mesh including one point.

The electronic apparatus 20 may perform the inner product operation on progress vectors OBx and OLx between a first center point O1 and the points Bx and Lx in the plurality of separated tooth regions 301' and the normal vectors n_Bx and n_Lx of the points Bx and Lx in the plurality of separated tooth regions 301' and determine a sign to distinguish the buccal cluster region 301B and the lingual cluster region 301L.

For example, the electronic apparatus 20 may calculate the inner product on the first progress vector OBx between the first center point O1 and the first point Bx and the first normal vector n_Bx to the first point Bx, and determine that the result value of the inner product operation is positive to distinguish the first point Bx in the plurality of separated tooth regions 301' as the buccal cluster region 301B.

In addition, the electronic apparatus 20 may calculate the inner product on the second progress vector OLx between the first center point O1 and the second point Lx and the second normal vector n_Lx for the second point Lx, and determine the result value of the inner product operation as negative, thereby distinguishing the second point Lx within the plurality of separated tooth regions 301' as a lingual cluster region 301L, but the technical idea of the present disclosure is not limited to the example of the above-described distinguishing operation.

The electronic apparatus 20 sets the plurality of reference points corresponding to the plurality of separated tooth regions 301' according to the buccal cluster region 301B and the lingual cluster region 301L (S440). The step (S440) of the electronic apparatus 20 setting the plurality of reference points will be described with reference to FIGS. 12 to 14 together.

Figure 13:
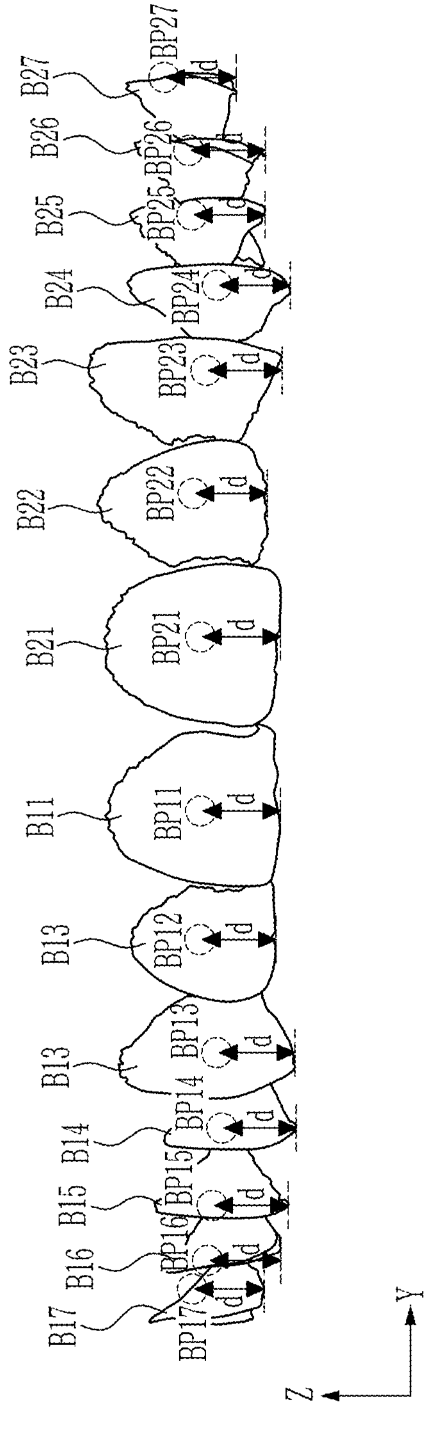

FIGS. 12 and 13 are diagrams for describing a step of setting a plurality of reference points for the buccal cluster region according to an exemplary embodiment. FIG. 14 is a diagram for describing a step of setting a plurality of reference points for a lingual cluster region according to an exemplary embodiment.

Referring to FIGS. 12 to 14, the plurality of reference points may include a plurality of buccal points BP11 to BP17 and BP21 to BP27 and a plurality of lingual points LL11 to LL17 and LL21 to LL27.

The electronic apparatus 20 may set the plurality of buccal points BP11 to BP17 and BP21 to BP27 based on the bottom surfaces of each of the plurality of teeth T11 to T17 and T21 to T27 for the buccal cluster region 301B.

The plurality of tooth buccal regions B11 to B17 and B21 to B27 may include the buccal surfaces of each of the plurality of teeth T11 to T17 and T21 to T27 included and separated in the buccal cluster region 301B, and the plurality of buccal points BP11 to BP17 and BP21 to BP27 may be reference points whose heights are adjusted in the third direction Z with respect to a plurality of buccal midpoints BC11 to BC17 and BC21 to BC27 of the plurality of tooth buccal regions B11 to B17 and B21 to B27.

The electronic apparatus 20 adjusts the plurality of buccal midpoints BC11 to BC17 and BC21 to BC27 to a height spaced apart from the bottom surfaces of each of the plurality of teeth T11 to T17 and T21 to T27 by a predetermined distance d, and thus set the plurality of buccal midpoints BC11 to BC17 and BC21 to BC27 as the plurality of buccal points BP11 to BP17 and BP21 to BP27. The predetermined distance d may be 0 mm to 5.0 mm, preferably 2 mm to 4 mm, but the technical idea of the present disclosure is not limited to the numerical range.

According to an exemplary embodiment, the predetermined distance d may be input or adjusted through the user interface device 23, so the electronic apparatus 20 may set the plurality of buccal points BP11 to BP17 and BP21 to BP27 through the input predetermined distance d.

The electronic apparatus 20 may set a plurality of lingual points LL11 to LL17 and LL21 to LL27 based on a second center point O2, which is the center of the gingival bottom surface Nc of the 3D-oriented bounding box (OBB) for the buccal cluster area 301B.

The plurality of tooth lingual regions L11 to L17 and L21 to L27 may include the lingual surfaces of each of the plurality of teeth T11 to T17 and T21 to T27 included and separated in the lingual cluster region 301L, and according to an exemplary embodiment, the number of tooth buccal regions B11 to B17 and B21 to B27 may be less than the number of tooth lingual regions L11 to L17 and L21 to L27 through the separation operation of steps S420 and S430.

For example, a 16th tooth and a 26th tooth may be separated into the buccal cluster region 301B and the lingual cluster region 301L after a portion of the tooth region is deleted in step S420, so the 16th tooth lingual region L16 may be separated into a 16_1st tooth lingual region L16_1 and a 16_2nd tooth lingual region L16_2, and the 26th tooth lingual region L26 may be separated into a 26_1st tooth lingual region L26_1 and a 26_2nd tooth lingual region L26_2, and the number of tooth buccal regions B11 to B17 and B21 to B27 may be less than the number of tooth lingual regions L11 to L17 and L21 to L27.

The electronic apparatus 20 may find the closest point from the second center point O2 for the plurality of tooth lingual regions L11 to L17 and L21 to L27 and set the plurality of lingual points LL11 to LL17 and LL21 to LL27, and the plurality of lingual points LL11 to LL17 and LL21 to LL27 may correspond to the plurality of tooth lingual regions L11 to L17 and L21 to L27.

The electronic apparatus 20 may generate a connecting curve CL connecting the plurality of lingual points LL11 to LL17 and LL21 to LL27.

The electronic apparatus 20 adjusts the interval between the plurality of reference points to re-sample the plurality of reference points (S450).

FIG. 15 is a diagram for describing a step of setting a plurality of re-sampling reference points and connection reference points for the lingual cluster region according to an exemplary embodiment.

Referring to FIG. 15, the electronic apparatus 20 may perform the re-sampling operation on the plurality of lingual points LL11 to LL17 and LL21 to LL27 for the lingual cluster region 301L. The electronic apparatus 20 may perform the re-sampling operation on the plurality of lingual points LL11 to LL17 and LL21 to LL27 by setting the plurality of re-sampling reference points LP11 to LP17 and LP21 to LP27 arranged at a first interval a on the connecting curve CL generated based on the plurality of lingual points LL11 to LL17 and LL21 to LL27. According to an exemplary embodiment, the first interval a may be determined based on the number of lingual points LL11 to LL17 and LL21 to LL27 and the length of the connecting curve CL.

The electronic apparatus 20 sets connection reference points CP1 and CP2 adjacent to the plurality of re-sampling reference points LP11 to LP17 and LP21 to LP27 and arranged along the shape of the maxillary tooth region 301 (S460).

The electronic apparatus 20 may set the connection reference points CP1 and CP2 that are closest to the 3D-oriented bounding box (OBB) in the first direction X, which is the centrifugal direction of the 3D-oriented bounding box (OBB), in the 17th tooth lingual region L17 and the 27th tooth lingual region L27 corresponding to both ends of the two molars of the maxillary scan data 101. According to an exemplary embodiment, the first connection reference point CP1 may be arranged most adjacent to the distal plane Nd of the 3D-oriented bounding box (OBB) in the 17th tooth lingual area L17, and the second connection reference point CP2 may be arranged most adjacent to the distal plane Nd of the 3D-oriented bounding box (OBB) in the 27th tooth lingual area L27.

FIGS. 16 and 17 are diagrams for describing a step of designating an outline and a step of displaying a designated outline according to an exemplary embodiment.

Referring to FIGS. 16 and 17, the electronic apparatus 20 designates the outline for the scan data based on the plurality of buccal points BP11 to BP17 and BP21 to BP27, the plurality of re-sampling reference points LP11 to LP17 and LP21 to LP27, and the connection reference points CP1 and CP2 (S470).

The electronic apparatus 20 may designate a splint outline OL passing through an outline point OP including the plurality of buccal points BP11 to BP17 and BP21 to BP27, the plurality of re-sampling reference points LP11 to LP17 and LP21 to LP27 and the connection reference points CP1 and CP2, and according to an exemplary embodiment, the designated splint outline OL may be a curve surrounding the maxillary tooth region 301, but is not limited thereto.

According to an exemplary embodiment, the outline point OP includes the plurality of buccal points BP11 to BP17 and BP21 to BP27, the plurality of re-sampling reference points LP11 to LP17 and LP21 to LP27, and the connection reference points CP1 and CP2, and may be reference points for generating the splint outline OL. According to an exemplary embodiment, the outline point OP may be manually or automatically positioned via the user interface device 23.

The electronic apparatus 20 may display the designated splint outline OL together with the scan data (S480).

The electronic device 20 may output the splint outline OL disposed on the maxillary scan data 101 through the display 24 of FIG. 1.

The method for processing an image according to an exemplary embodiment of the present invention may be implemented in a form of program commands that may be executed through various computer means and may be recorded in a computer-readable recording medium. In addition, an embodiment of the present disclosure may be a computer-readable recording medium on which one or more programs including commands for executing an image processing method are recorded.

The computer-readable medium may include a program command, a data file, a data structure, or the like, or a combination thereof. The program commands recorded in the computer-readable recording medium may be especially designed and configured for the present disclosure or be known to those skilled in a field of computer software. Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program commands include high-level language codes capable of being executed by a computer using an interpreter, or the like, as well as machine language codes made by a compiler.

Here, the machine-readable storage medium may be provided in a form of a non-transitory storage medium. Here, the "non-transitory storage medium" means that the storage medium is a tangible device, and does not include a signal (for example, electromagnetic waves), and the term does not distinguish between the case where data is stored semi-permanently on a storage medium and the case where data is temporarily stored thereon. For example, the "non-transitory storage medium" may include a buffer in which data is temporarily stored.

According to an embodiment, the methods according to various embodiments disclosed in the document may be included in a computer program product and provided. The computer program product may be traded as a product between a seller and a purchaser. The computer program product may be distributed in the form of a machine-readable storage medium (for example, compact disc read only memory (CD-ROM)), or may be distributed through an application store (for example, Play Store™) or may be directly distributed (for example, download or upload) between two user devices (for example, smart phones) online. In a case of the online distribution, at least some of the computer program products (for example, downloadable app) may be at least temporarily stored in a machine-readable storage medium such as a memory of a server of a manufacturer, a server of an application store, or a relay server or be temporarily created.

Although exemplary embodiments of the present disclosure have been described in detail hereinabove, the scope of the present disclosure is not limited thereto, but may include several modifications and alterations made by those skilled in the art using a basic concept of the present disclosure as defined in the claims.

The invention claimed is:

1. An electronic apparatus, comprising:
a user interface device;
a processor; and
a memory configured to store instructions executable by the processor, wherein the processor is configured to execute the instructions to:
receive at least one intraoral image;
set a plurality of outline points for the at least one intraoral image; and
display an outline designated based on the plurality of outline points on the intraoral image; wherein:
the operation of setting the plurality of outline points includes:
extracting a tooth region from the at least one intraoral image;
identifying a space between teeth in the tooth region and separating the teeth into a plurality of separated tooth regions;
separating the plurality of separated tooth regions into a buccal cluster region and a lingual cluster region based on a direction of a normal vector in the plurality of separated tooth regions;
setting a plurality of reference points corresponding to the plurality of separated tooth regions for the buccal cluster region and the lingual cluster region;
re-sampling at least a portion of the plurality of reference points by adjusting an interval between the plurality of reference points; and
setting a connection reference point adjacent to the plurality of reference points and arranged based on a shape of the tooth region.

2. The electronic apparatus of claim 1, wherein: the separating of the buccal cluster region and the lingual cluster region includes generating a 3D-oriented bounding box including the plurality of separated tooth regions.

3. The electronic apparatus of claim 2, wherein:
the one side surface of the 3D-oriented bounding box through which a midline of the at least one intraoral image passes is a distal plane based on the at least one intraoral image.

4. The electronic apparatus of claim 3, wherein:
the one side surface of the 3D-oriented bounding box through which a midline of the at least one intraoral image passes is a distal plane based on the at least one intraoral image.

5. The electronic apparatus of claim 3, wherein:
the setting of the plurality of reference points includes
setting a plurality of buccal points spaced apart from each of the bottom surfaces corresponding to the plurality of separated tooth regions by a predetermined distance, with respect to the buccal cluster region.

6. The electronic apparatus of claim 3, wherein:
the setting of the plurality of reference points includes
setting a plurality of lingual points corresponding to the plurality of separated tooth regions and closest to a second midpoint of a bottom surface of a gingival direction of the 3D-oriented bounding box, with respect to the lingual cluster region.

7. The electronic apparatus of claim 2, wherein:
the setting of the connection reference points includes
setting a connection reference point closest to the 3D-oriented bounding box in the distal direction of the at least one intraoral image in the plurality of separated tooth regions corresponding to molars at both ends of the at least one intraoral image.

8. The electronic apparatus of claim 2, wherein:
the re-sampling of the plurality of reference points includes:
forming a connecting curve connecting the plurality of reference points for the lingual cluster region; and
setting the plurality of re-sampling reference points arranged at regular intervals on the connecting curve.

9. A non-transitory computer readable storage medium including computer readable instructions,
wherein the instructions cause the computer to:
receive at least one intraoral image;
set a plurality of outline points for the at least one intraoral image; and
display an outline designated based on the plurality of outline points on the intraoral image; wherein:
the operation of setting the plurality of outline points includes:
extracting a tooth region from the at least one intraoral image;

identifying a space between teeth in the tooth region and separating the teeth into a plurality of separated tooth regions;

separating the plurality of separated tooth regions into a buccal cluster region and a lingual cluster region based on a direction of a normal vector in the plurality of separated tooth regions;

setting a plurality of reference points corresponding to the plurality of separated tooth regions for the buccal cluster region and the lingual cluster region;

re-sampling at least a portion of the plurality of reference points by adjusting an interval between the plurality of reference points; and setting a connection reference point adjacent to the plurality of reference points and arranged based on a shape of the tooth region.

10. A method for processing an image, comprising:

receiving at least one intraoral image;

setting a plurality of outline points for the at least one intraoral image; and displaying an outline designated based on the plurality of outline points on the at least one intraoral image; wherein:

the setting of the plurality of outline points includes:

extracting a tooth region from the at least one intraoral image;

identifying a space between teeth in the tooth region and separating the teeth into a plurality of separated tooth regions;

separating the plurality of separated tooth regions into a buccal cluster region and a lingual cluster region based on a direction of a normal vector in the plurality of separated tooth regions;

setting a plurality of reference points corresponding to the plurality of separated tooth regions for the buccal cluster region and the lingual cluster region;

re-sampling at least a portion of the plurality of reference points by adjusting an interval between the plurality of reference points; and setting a connection reference point adjacent to the plurality of reference points and arranged based on a shape of the tooth region.

11. The method of claim 10, wherein: the separating of the buccal cluster region and the lingual cluster region includes generating a 3D-oriented bounding box including the plurality of separated tooth regions.

12. The method of claim 11, wherein:

the separating of the buccal cluster region and the lingual cluster region includes comparing directions of a first vector extending from a first midpoint of one side of the 3D-oriented bounding box to a first point within the plurality of separated tooth regions and a normal vector of the first point.

13. The method of claim 12, wherein:

the one side surface of the 3D-oriented bounding box through which a midline of the at least one intraoral image passes is a distal plane based on the at least one intraoral image.

14. The method of claim 12, wherein:

the setting of the plurality of reference points includes setting a plurality of buccal points spaced apart from each of the bottom surfaces corresponding to the plurality of separated tooth regions by a predetermined distance, with respect to the buccal cluster region.

15. The method of claim 12, wherein:

the setting of the plurality of reference points includes setting a plurality of lingual points corresponding to the plurality of separated tooth regions and closest to a second midpoint of a bottom surface of a gingival direction of the 3D-oriented bounding box, with respect to the lingual cluster region.

16. The method of claim 11, wherein:

the setting of the connection reference points includes setting a connection reference point closest to the 3D-oriented bounding box in the distal direction of the at least one intraoral image in the plurality of separated tooth regions corresponding to molars at both ends of the at least one intraoral image.

17. The method of claim 11, wherein:

the re-sampling of the plurality of reference points includes:

forming a connecting curve connecting the plurality of reference points for the lingual cluster region; and setting the plurality of re-sampling reference points arranged at regular intervals on the connecting curve.

18. The method of claim 10, wherein: in the separating of the buccal cluster region and the lingual cluster region, the number of separated tooth regions in the buccal cluster region is less than the number of separated tooth regions in the lingual cluster region.

* * * * *